(12) United States Patent
Estanislao

(10) Patent No.: US 11,344,808 B2
(45) Date of Patent: May 31, 2022

(54) SYSTEMS AND METHODS FOR DYNAMICALLY GENERATING AND MODULATING MUSIC BASED ON GAMING EVENTS, PLAYER PROFILES AND/OR PLAYER REACTIONS

(71) Applicant: Activision Publishing, Inc., Santa Monica, CA (US)

(72) Inventor: Jon Ray Estanislao, South Pasadena, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/913,015

(22) Filed: Jun. 26, 2020

(65) Prior Publication Data
US 2020/0406144 A1    Dec. 31, 2020

Related U.S. Application Data

(60) Provisional application No. 62/868,538, filed on Jun. 28, 2019.

(51) Int. Cl.
| | |
|---|---|
| *A63F 13/00* | (2014.01) |
| *A63F 13/54* | (2014.01) |
| *A63F 13/87* | (2014.01) |
| *A63F 13/79* | (2014.01) |
| *A63F 13/67* | (2014.01) |

(52) U.S. Cl.
CPC .............. *A63F 13/54* (2014.09); *A63F 13/67* (2014.09); *A63F 13/79* (2014.09); *A63F 13/87* (2014.09)

(58) Field of Classification Search
CPC ............. G07F 17/3225; G07F 17/3239; G07F 17/3276; G07F 17/3272; G07F 17/3262
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Omkar A Deodhar
*Assistant Examiner* — Eric M Thomas
(74) *Attorney, Agent, or Firm* — Novel IP

(57) ABSTRACT

The application describes methods and systems for dynamically generating a music clip for rendering at client devices in a multi-player gaming network. Player data and event data are acquired and classified into two or more profiles. The music clip is then generated by identifying a mood based on one of the two or more event profiles and one of the two or more player profiles and modulating one or more music elements of a segment of audio data based on the identified mood.

16 Claims, 5 Drawing Sheets

| | | Beginner | Enthusiast | Expert |
|---|---|---|---|---|
| Merit Profile of Virtual Interaction and/or Situation | Crucial Merit or Value of Interaction or Situation | Generate Music Perceptible or Indicative of a Frantic Mood | Generate Music Perceptible or Indicative of a Frantic Mood | Generate Music Perceptible or Indicative of a Frantic Mood |
| | Moderate Merit or Value of Interaction or Situation | Generate Music Perceptible or Indicative of a Frantic Mood | Generate Music Perceptible or Indicative of an Energetic Mood | Generate Music Perceptible or Indicative of an Energetic Mood |
| | Marginal Merit or Value of Interaction or Situation | Generate Music Perceptible or Indicative of a Calm Mood | Generate Music Perceptible or Indicative of a Calm Mood | Generate Music Perceptible or Indicative of a Calm Mood |

Situation or Interaction Analysis → 200

Player Skill and/or Experience Profile → 205

210

(56) References Cited

U.S. PATENT DOCUMENTS

| | | | |
|---|---|---|---|
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B2 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D'Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |

(56) References Cited

U.S. PATENT DOCUMENTS

| | | |
|---|---|---|
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D'Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,565,906 B1 * | 10/2013 | Alexander ............ A63F 13/814 700/94 |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2009/0113448 A1 | 4/2009 | Smith |
| 2014/0344725 A1 | 11/2014 | Bates |
| 2016/0191671 A1 | 6/2016 | Dawson |
| 2018/0109820 A1 * | 4/2018 | Pompa ............... H04N 21/4781 |
| 2018/0350144 A1 * | 12/2018 | Rathod ............. G06Q 20/3276 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |

(56) References Cited

FOREIGN PATENT DOCUMENTS

| | | |
|---|---|---|
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

SYSTEMS AND METHODS FOR DYNAMICALLY GENERATING AND MODULATING MUSIC BASED ON GAMING EVENTS, PLAYER PROFILES AND/OR PLAYER REACTIONS

CROSS REFERENCE

The present specification relies on, for priority, U.S. Patent Provisional Application No. 62/868,538 entitled "Systems and Methods For Dynamically Generating And Modulating Music based On Gaming Events, Player Profiles and/or Player Reactions", filed on Jun. 28, 2019, which is incorporated by reference herein in its entirety.

FIELD

The present specification is related generally to the field of video games. More specifically, the present specification is related to systems and methods that dynamically generate and modulate music based on a player profile, a gaming event and/or a player reaction during the gaming events.

BACKGROUND

Multiplayer online gaming has seen explosive proliferation across the globe with access to a wide range of age groups. A key element of gameplay is the music played at different moments in the game to punctuate an event. For example, upon passing the finish line of a racing game, a celebratory song may be played. Upon finding treasure or passing a game level, the game may play an uplifting melody.

While many features of video games have become highly customizable, musical elements tend to be standardized across all players. For example, a player can customize the aesthetic look of his or her avatar or customize team members in a multiplayer game but, conventionally, is not able to customize musical elements for different gaming events. Some video games allow for the replacement of a soundtrack of a game with a player's own music, but such soundtrack replacement features do not provide for the dynamic change or modification of musical elements specific to a player and based on the actual gameplay.

Music and audio are areas of potential player customization that may be automated and personalized so that each individual player has a unique experience. Accordingly, there is need for systems and methods that generate and modulate music unique to individual players, e.g. specific to a level of the player's skill and/or experience, and based on one or more of gaming event(s) that a player encounters, the player's reaction(s), the player's response(s), the player's input(s) and/or the player's movement(s) during the gaming events. There is also a need for systems and methods that correlate generated and modulated music to the player's success or failure during gameplay and that use the correlation to improve the player's performance in future gameplay. By automating the process of what kind of music is being played and how the music is modulated, the video game may become more immersive, become more enjoyable and provide players with a wide variety of customizable features in order to enhance the overall user experience.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer-implemented method of dynamically generating a music clip for rendering at each of a plurality of client devices corresponding to each of a plurality of players in a multi-player gaming network, wherein the multi-player gaming network comprises at least one game server in data communication with the plurality of client devices located remote from each other, the method comprising: receiving, in the at least one game server, player data corresponding to each of said plurality of players, wherein said player data is received from a plurality of game modules stored locally in each of the plurality of client devices; classifying, in the at least one server and using said player data, each of said plurality of players into one or more player profiles; generating, in the at least one game server, event data based on data indicative of a player's engagement with one or more virtual elements during gameplay and based on data associated with each of said one or more virtual elements; classifying, in the at least one server, the event data into two or more event profiles; generating the music clip based on at least one of the two or more event profiles and at least one of the one or more player profiles; and transmitting the generated music clip to at least one of the plurality of client devices.

Optionally, the music clip is generated by identifying a mood based on the at least one of the two or more event profiles and the at least one of the one or more player profiles.

Optionally, the music clip is generated by modulating one or more elements of a segment of audio data based on the identified mood. Optionally, the one or more elements comprise beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture or spatial location.

Optionally, the music clip is generated by selecting a segment of audio data based on the identified mood.

Optionally, the music clip is generated by implementing at least one machine learning model using the at least one of the two or more event profiles and the at least one of the one or more player profiles.

Optionally, additional music clips are generated by implementing at least one machine learning model using at least one of the plurality of players' responses during engagement with said one or more virtual elements.

Optionally, said data indicative of the player's engagement with said one or more virtual elements is received from a game module of the player's client device.

Optionally, said two or more player profiles comprise a beginner level of skill and/or experience, an enthusiast level of skill and/or experience, and an expert level of skill and/or experience.

Optionally, the two or more event profiles comprise a first event profile representative of a low value of the player's engagement, a second event profile representative of a medium value of the player's engagement, and a third event profile representative of a high value of the player's engagement.

In some embodiments, the present specification discloses a system for dynamically generating a music clip for rendering at each of a plurality of client devices corresponding to each of a plurality of players in a multi-player gaming network, wherein the multi-player gaming network comprises at least one game server in data communication with the plurality of client devices located remote from each other, the server comprising a plurality of programmatic instructions that, when executed: receive player data corresponding to each of said plurality of players, wherein said player data is received from a plurality of game modules stored locally in each of the plurality of client devices; classify each of the plurality of players into one or more player profiles; generate event data based on data indicative of a player's engagement with one or more virtual elements during gameplay and based on data associated with each of said one or more virtual elements; classify the event data into two or more event profiles; generate the music clip based on at least one of the two or more event profiles and at least one of the two or more player profiles; and transmit the generated music clip to at least one of the plurality of client devices.

Optionally, the plurality of programmatic instructions, when executed, generate the music clip by identifying a mood based on the at least one of the two or more event profiles and the at least one of the one or more player profiles.

Optionally, the plurality of programmatic instructions, when executed, generate the music clip by modulating one or more elements of a segment of audio data based on the identified mood. Optionally, the one or more elements comprise beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture or spatial location.

Optionally, the plurality of programmatic instructions, when executed, generate the music clip by selecting a segment of audio data based on the identified mood.

Optionally, the plurality of programmatic instructions, when executed, generate the music clip by implementing at least one machine learning model using the at least one of the two or more event profiles and the at least one of the one or more player profiles.

Optionally, the plurality of programmatic instructions, when executed, generate additional music clips by implementing at least one machine learning model using at least one of the plurality of players' responses during engagement with said one or more virtual elements.

Optionally, said data indicative of the player's engagement with said one or more virtual elements is received from a game module of the player's client device.

Optionally, the one or more player profiles comprise a beginner level of skill and/or experience, an enthusiast level of skill and/or experience, and an expert level of skill and/or experience.

Optionally, the two or more event profiles comprise a first event profile representative of a low value of the player's engagement, a second event profile representative of a medium value of the player's engagement, and a third event profile representative of a high value of the player's engagement.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1:
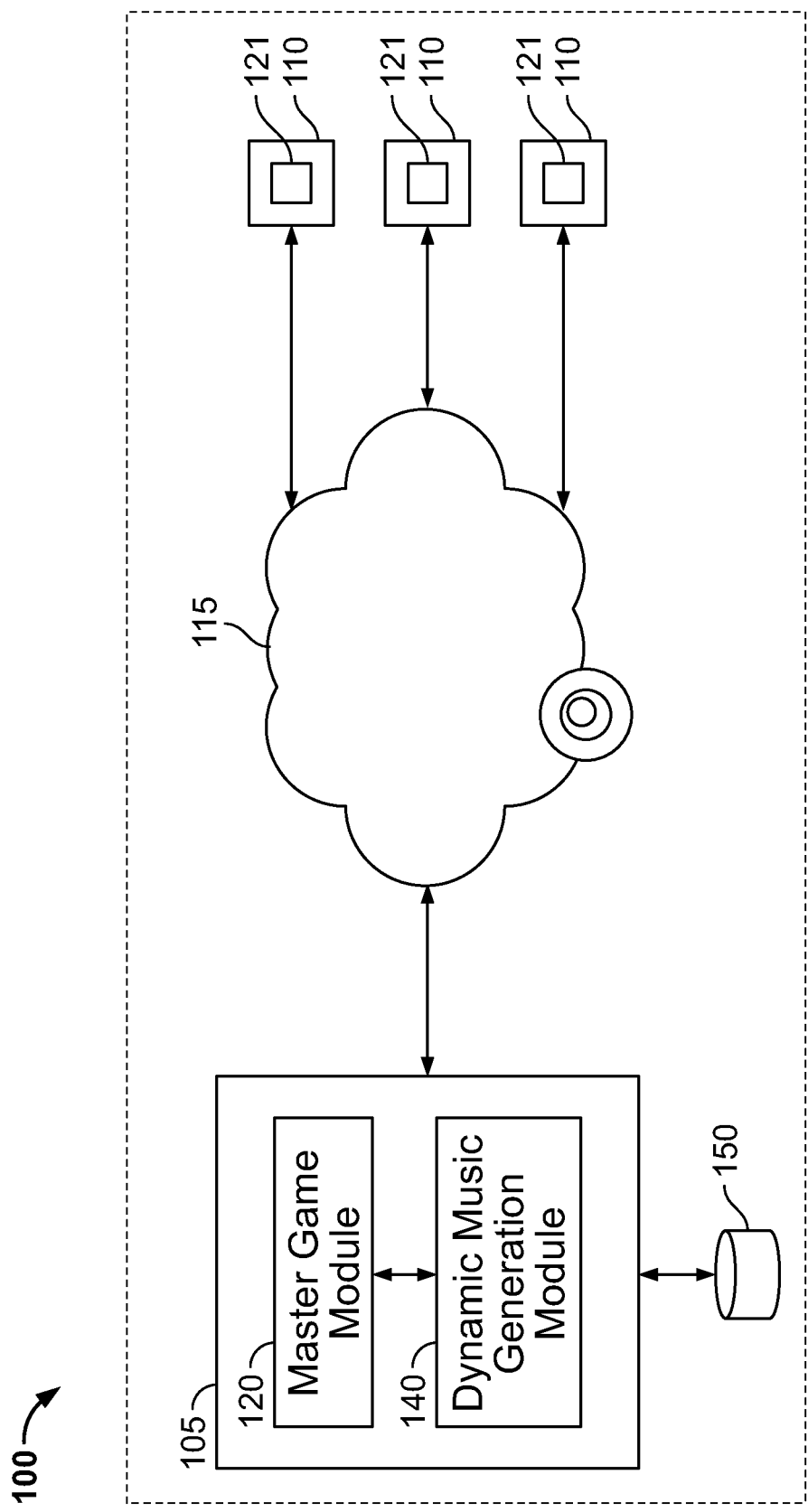
FIG. 1 is a block diagram illustrating a multi-player online gaming environment for implementing dynamic music generation and augmentation systems and workflows, in accordance with embodiments of the present specification.

Music and audio are another area of video game features that may be highly customizable in an automated and personalized fashion so that each individual player has a unique experience. By automating the process of what kind of music is being played and to what intensity based on the situation, player experience, etc., music and audio can create more immersive and enjoyable gameplay experiences. By leveraging artificial intelligence (AI), an infinite combination of music and audio can be automatically generated to avoid having to manually create music/audio which then needs to be tagged for play based on different situational queues.

The present specification provides for various methods to dynamically generate music based on the video game situation and the responses of the video game player. In some embodiments, the present specification describes a method to leverage artificial intelligence (AI) to dynamically generate music based on the in-game environment, which may include, but is not limited to, physical objects, lighting, and non-playable characters (NPC). In some embodiments, the present specification describes methods to further modify and adapt AI-generated music dynamically based on video game player controller movements and game progression.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

The term "module" used in this disclosure may refer to computer logic utilized to provide a desired functionality, service, or operation by programming or controlling a general purpose processor. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

The terms "a multi-player online gaming environment" or "massively multiplayer online game" or "large-scale multi-player online game" may be construed to mean a specific hardware architecture in which one or more servers electronically communicate with, and concurrently support game interactions with, a plurality of client devices, thereby enabling each of the client devices to simultaneously play in the same instance of the same game. In embodiments, it is preferable that the plurality of client devices number in the dozens, still preferably hundreds, and still preferably thousands. In one embodiment, the number of concurrently supported client devices ranges from 10 to 5,000,000 and every whole number increment or range therein. Accordingly, a multi-player gaming environment, massively multi-player online game, or large-scale multiplayer online game is a computer-related technology, a non-generic technological environment, and should not be abstractly considered a generic method of organizing human activity divorced from its specific technology environment.

It should be appreciated that while the systems and methods of the present specification are described with reference to a multi-player online gaming environment for ease of elucidation, this should in no way be considered limiting and that the systems and methods of the present specification are applicable for single player and offline games as well.

As used herein, the indefinite articles "a" and "an" mean "at least one" or "one or more" unless the context clearly dictates otherwise.

Overview

FIG. 1 illustrates an embodiment of a multi-player online gaming environment or a large-scale multi-player online game 100 in which real-time dynamic music generation and modification/augmentation systems and workflows of the present specification may be implemented or executed. The environment 100 comprises a client-server architecture, where one or more game servers 105 are in data communication with one or more client devices 110 over a network 115. Players may access the environment 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

In various embodiments, a computing device includes an input/output controller, at least one communications interface; and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

Referring back to FIG. 1, the one or more game servers 105 may be any computing device having one or more processors and one or more computer-readable storage media such as RAM, a hard disk or any other optical or magnetic media. The one or more game servers 105 include a plurality of modules operating to provide or implement a plurality of functional, operational or service-oriented methods of the present specification.

In some embodiments, the one or more game servers 105 include or are in communication with at least one database system 150. The database system 150 stores a plurality of data such as, but not limited to, player identification and demographic data (such as, but not limited to, player ID, name, gender, nationality, and age), a plurality of player data, music and audio data, data associated with at least one machine learning model and game data associated with at least one game that is served or provided to the client devices 110 over the network 115. The database system 150 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 150 may comprise one or more such databases that reside in one or more physical devices and in one or more physical locations.

In some embodiments, the one or more game servers 105 may be implemented by a cloud of computing platforms operating together as game servers 105.

In accordance with aspects of the present specification, the one or more game servers 105 provide or implement a plurality of modules such as, but not limited to, a master game module 120 and a dynamic music generation module 140. In some embodiments, the one or more client devices 110 are configured to implement or execute one or more of a plurality of client-side modules that are same as or similar to the modules of the one or more game servers 105. For example, in some embodiments the client devices 110 execute a client-side game module 121.

Master Game Module 120

In embodiments, the master game module 120 implements a plurality of instructions or programmatic code to execute an online game to facilitate interaction of the players with the game. In embodiments, an instance of the executed online game may be synchronous, asynchronous, and/or semi-synchronous. The master game module 120 controls aspects of the game for all players and receives and processes each player's input, activities and interactions in the game. Thus, the master game module 120 hosts the online game for all players, receives game data from the client devices 110, and transmits updates to all client devices 110 based on the received game data so that the game, on each of the client devices 110, represents the most updated or current status with reference to interactions of all players with the game. The master game module 120 therefore transmits game data over the network 115 to the client devices 110 for use by the client game module 121 to provide a local version and a current status of the game to the players.

In embodiments, the master game module 120 generates and maintains server-side player data that is updated with client-side player data received from all client devices 110. Thus, the server-side player data is representative of a comprehensive set of player data encompassing what is occurring or what has occurred as a result of an interaction of all the players with the virtual environment of the game. In embodiments, the server-side player data is stored and updated in the at least one database system 150.

In some embodiments, the master game module 120 classifies the server-side data of all players into a plurality of predefined player profiles or categories such as, for example, expert, enthusiast and beginner wherein each player profile is indicative of a level of skill and/or experience of the player. Thus, the expert player profile represents a highest level of skill and/or experience, the enthusiast player profile represents a moderate or medium level of skill and/or experience and the beginner player profile represents a low or novice level of skill and/or experience. The number of player profiles or categories may vary in alternate embodiments. In some embodiments, the master game module 120 classifies the server-side player data of all players on a numerical scale of for example, 1 to 3, where 1 is representative of a highest level of skill and/or experience, 2 is representative of a moderate or medium level of skill and/or experience and 3 is representative of a low or novice level of skill and/or experience. In alternate embodiments, the numerical scale may vary in a range of, for example, 1 to 5, 1 to 10, all the way to 1 to n or any increment therein. It should be appreciated that the player's level of skill and/or experience could also vary throughout or within a game such that a player could be new to a certain gameplay experiences but very skilled in other gameplay experiences.

In some embodiments, the master game module 120 also stores and maintains, in the at least one database system 150, additional player data associated with a plurality of in-game virtual elements such as, but not limited to, virtual objects or items, characters, obstacles, platforms, lighting, topographical or terrain related features, regions or locations in the game map (collectively referred to hereinafter as 'topographical elements'), and virtual status such as, for example, a level of the game.

In some embodiments, the additional player data is pre-determined, pre-stored or pre-assigned to each of the plurality of in-game virtual elements and is indicative of at least one of: a) a level of difficulty, complexity or challenge associated with the virtual element, b) a level of significance or esteem associated with the virtual element, and c) a level of reward, advantage and/or reprimand associated with the virtual element. In some embodiments, the additional player data may be configured or determined in terms of points, rewards or advantage that the player may earn or forego depending upon an outcome of the player's interaction with or in the context of the plurality of virtual elements during game play. In some embodiments, the points, rewards or advantage earned or foregone translate into player data encompassing game-specific measure(s) or statistics indicative of the player's level of skill and/or experience.

In embodiments, the master game module 120 a) receives, from the game module 121, data indicative of player inputs/responses, engagements, interactions and position within the virtual environment of the game, and b) dynamically or in real-time determines composite player data based upon the pre-stored player data associated with each of the plurality of virtual elements that the player is currently engaged with, interacting with, immersed in or positioned in. In various embodiments, the composite player data is determined as an aggregate or a weighted aggregate of the pre-stored player data associated with each of the plurality of virtual elements.

Thus, the composite player data is indicative of a significance or value associated with the player's on-going interaction and/or situation within the gameplay. In some embodiments, the master game module 120 classifies the composite player data associated with the player into a plurality of predefined player profiles or categories such as, for example, into at least first, second and third merit categories wherein the first merit category (or crucial merit) is representative of interactions and/or situations of the highest, most significant or crucial value, the second merit category (or moderate merit) is representative of interactions and/or situations of moderate or medium value and the third merit category (marginal merit) is representative of interactions and/or situations of least or marginal value.

The number of categories may vary in alternate embodiments. In some embodiments, the master game module 120 classifies the composite player data of the player on a numerical scale of, for example, 1 to 3 where 1 is representative of interactions and/or situations of the highest, most significant or crucial value, 2 is representative of interactions and/or situations of moderate or medium value and 3 is representative of interactions and/or situations of least or marginal value. In alternate embodiments, the numerical scale may vary in a range of, for example, 1 to 5, 1 to 10, all the way to 1 to n or any increment therein.

Thus, in some embodiments, the master game module 120 pre-categorizes a player's in-game interaction or event as crucial, marginal or moderate as dictated by a game design. An interaction or event of marginal merit or value may be, for example, fighting and defeating a common, relatively weak enemy. An interaction or event of moderate merit or value may be, for example, completing a lengthy and somewhat challenging game puzzle. Finally, an interaction or event of crucial merit or value may be, for example, fighting and defeating a major boss which prevents any further game progression until the boss is defeated or unlocks a critical item in the game.

In some embodiments, a machine learning (ML) model is leveraged during a test phase of the game or during a live in-game environment with existing players to define categories for and/or categorize a plurality of interactions and events of the players based on how quickly the plurality of interactions or events are completed by the players or how many times the plurality of interactions or events must be replayed for the players to continue on with the game progression. In some embodiments, a hybrid approach is utilized wherein some interactions and events are pre-categorized but those interactions and events could be re-categorized using ML based on data collected from game testing or actual player interactions and events.

Thus, the master game module 120 generates and stores (in the at least one database system 150) player profile by categorizing a player in accordance to his level of skill and/or experience and merit profile by categorizing the interaction and/or situation that the player engages in during gameplay. In embodiments, the player profile is updated based on pre-programmed periodicity of updates to the server-side leaderboard data while the merit profile is updated in real-time or almost real-time as the player's interaction and/or situation progresses during the gameplay.

Game Module 121

On the client-side, each of the one or more client devices 110 implements the game module 121 that operates as a gaming application and implements a plurality of instructions or programmatic code to provide an interface between a player and the game. The game module 121 generates the interface to render a virtual environment, virtual space, or virtual world associated with the game and enables the player to interact in the virtual environment to perform a plurality of game tasks and objectives. The game module 121 accesses game data received from the master game module 120 to provide an accurate representation of the game to the player. The game module 121 captures and processes player inputs and interactions within the virtual environment and provides updates to the master game module 120 over the network 115.

In embodiments, the game module 121 captures and stores a plurality of client-side player data generated as a result of the player's interactions with the virtual environment of the game. The captured and stored client-side player data is communicated back or uploaded to the master game module 120 in real-time, periodically (such as through batch updates) during a gameplay and/or at an end of the gameplay. The game module 121 accesses updated or most current server-side player data from the master game module 120 and presents or displays the accessed server-side player data via one or more GUIs (Graphical User Interface) to the player.

In embodiments, the client-side player data is associated with a plurality of player related metrics, scoring, or statistics and/or in-game event data generated as a result of the player's interactions with the virtual environment of the game. In embodiments, the client-side player data comprises data such as, but not limited to, a) data related to a plurality of scoring events that occur during a match. For example, high scores, kills or captures, fastest time periods to achieve certain scores, clearance of specific game levels and/or the winning of specific matches by a set of 'N' number of top performing players, ranking of the player with reference to the top 'N' players and b) data associated with in-game events such as, but not limited to, the movement of the player throughout the virtual environment or topographical map of the game, interaction of the player's avatar with various virtual characters or elements in the game, virtual elements or items used and/or won, damage taken, perks acquired, number of times in a row (or not) that the player hits or misses a target or objective such as, for example, an enemy, number of times (or not) that the player attempts to get to a certain topographical position or location, the number of times the player dies and needs to continue from a previous checkpoint, or whether the player repeats a specific interaction or movement pattern. It should be appreciated that the client-side player data will vary depending upon the type, nature and objectives of the game and therefore encompasses any gameplay data relevant to and defined for a particular type of game and its objectives.

In the present specification, the player data is characterized as a) client-side player-specific data generated and stored at the client devices 110 (as a result of a player playing a game) and communicated back or uploaded to the master game module 120, and b) server-side player data stored at the master game module 120 as a result of processing of client-side player data received from all client devices 110 of all players. The server-side player data is updated with client-side player data received from all client devices 110 and therefore is representative of a comprehensive player data encompassing what is occurring or what has occurred as a result of an interaction of all the players with the virtual environment of the game.

Dynamic Music Generation Module 140

For a player engaged in gameplay, in a gaming session, the dynamic music generation module 140 receives the above-described player data either by querying the at least one database system 150 or by making a request to the master game module 120. In accordance with some aspects of the present specification, the dynamic music generation module 140 implements a plurality of instructions or programmatic code to enable dynamic and real-time a) generation of music dependent on the player data representative of a virtual interaction and/or situation that the player encounters or engages in during gameplay, wherein the generated music is rendered or played on the client device 110 of the player, and b) augmentation, adaptation, re-mixing or modulation of the generated music on the basis of the responses, inputs, controls or movements of the player during a progression, development or advancement of the virtual interaction and/or situation. It should be noted that in some alternate embodiments, the dynamic and real-time generation of music is random and not dependent on the player profile and/or merit profile. It should be appreciated that music generation is enabled at 'commencement' of a virtual interaction and/or situation while music augmentation, adaptation, re-mixing or modulation is enabled during and in accordance with how the virtual interaction and/or situation 'progresses'. Also, in some embodiments, music may be generated by modulating a pre-stored music clip that acts as a 'seed' to the generation of music.

Thus, in some embodiments, the generation and modulation of music is based on a plurality of pre-recorded 'seed' music files, segments or clips pre-stored in the at least one database system 150. In various embodiments, the plurality of pre-recorded music or audio sample files may either be original compositions or licensed music with rights to modulation or re-mixing.

In some embodiments, music is generated and modulated by leveraging artificial intelligence (AI) comprising at least one machine learning (ML) model that trains on private and/or publicly available open datasets of music to learn to manipulate a plurality of music elements based on a plurality of programmed rules. In various embodiments, the ML model may be a deep learning network such as, but not limited to, at least one or a combination of perceptron neural network, feed forward neural network, radial basis neural network, deep feed forward neural network, convolutional neural networks (CNN), recurrent neural networks (RNN), long short-term memory (LS™) networks, gated recurrent unit neural network, variational auto-encoder neural network, denoising auto-encoder neural network, sparse auto-encoder neural network, Markov Chain neural network, Hopfield neural network, Boltzmann Machine neural network, Restricted Boltzmann Machine neural network, deep belief neural network, deconvolutional neural network, deep convolutional inverse graphics neural network, generative adversarial neural network, liquid state machine, extreme learning machine, echo state neural network, deep residual neural network, Kohonen neural network, support vector machine, neural turing machine, and auto-encoder neural networks. Non-limiting examples of open source ML models for music generation and modulation include Amper Music, Jukedeck, Magenta, DeepJazz, BachBot, and Gruv.

In various embodiments, music is generated/composed and modulated by dynamically manipulating one or more of a plurality of music elements such as, for example, beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture and spatial location to adjust for gameplay and enhance the player's gaming experience.

In some embodiments, a portion of the programmatic instructions related to the dynamic music generation module 140 is implemented on the one or more game servers 105 while another portion of the programmatic instructions may reside and be implemented on a player's game module 121. In some embodiments, specifically, programmatic instruction related to the at least one ML model reside and are implemented on a player's game module 121.

In various embodiments, in addition to the above-mentioned musical elements being dynamically modified, game data may be collected and collated from large numbers of players for many games, either individually or concurrently. The collected game data can be used to inform the AI of similar or dissimilar play patterns/gameplay interactions (that is, how a player interacts with the game), which can then be used to define how players subsequently react to variations of those musical elements in subsequent game events. Stated differently, the collected game data may be used to infer how different music affects how players play various scenarios in a game. Further, this approach may be used for offline game scenarios. During quality control and testing of a particular game, the system may aggregate a large number of repeat play-throughs of the same data. In this scenario, the AI can be used to create musical variations in advance, such that they are predetermined versus dynamic. The client software may then match player performance with the predetermined musical variations and subsequently play the appropriate music. The gameplay interactions, levels of performance, and combinations of these with modified music may be numerous and infinite in nature, necessitating technical approaches.

Table A, presented below, illustrates how four exemplary music elements—intensity, timbre, pitch and rhythm—may be manipulated dynamically (on a scale of very low, low, medium, high and very high) to generate eight exemplary moods of music.

TABLE A

| Mood of Music | Intensity | Timbre | Pitch | Rhythm |
|---|---|---|---|---|
| Happy | Medium | Medium | Very High | Very High |
| Exuberant | High | Medium | High | High |
| Energetic | Very High | Medium | Medium | High |
| Frantic | High | Very High | Low | Very High |
| Anxious/Sad | Medium | Very Low | Very Low | Low |
| Depression | Low | Low | Low | Low |
| Calm | Very Low | Very Low | Medium | Very Low |
| Contentment | Low | Low | High | Low |

In some embodiments, at least a subset of the plurality of music elements is manipulated to generate music based on at least two vectors: 1) the importance, value, or merit of a particular game event, interaction or situation and 2) the player's skill and/or experience profile. In one embodiment, the dynamic music generation module 140 receives, from at least one of the game module 121 or master game module 120, data indicative of a player's movement, interactions, or situation in a game in real-time—that is, data indicative of the merit or value of an interaction and/or situation that the player encounters during gameplay. The dynamic music generation module 140 also receives from one or more databases 150 player data indicative of the player's skill and/or experience profile, as previously described above. With both sets of data, the dynamic music generation module 140 determines a particular music category, as shown in FIG. 2 and as further discussed below.

Once a music category is determined, such as happy, exuberant, energetic, frantic, anxious, sad, depressed, calm, or content, the dynamic music generation module 140 modulates, in real-time, one or more music elements of a segment of music (stored in the at least one database system 150) to achieve a clip of music corresponding to the determined category. For example, the beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture or spatial location of an audio clip may be modulated by the dynamic music generation module 140 to achieve the determined music category. Once done, the dynamic music generation module 140 transmits the newly composed music clip to at least one of the game module 121 or master game module 120 for use in the game, in association with the player's movement, interactions, or situation in real-time.

Figure 2:
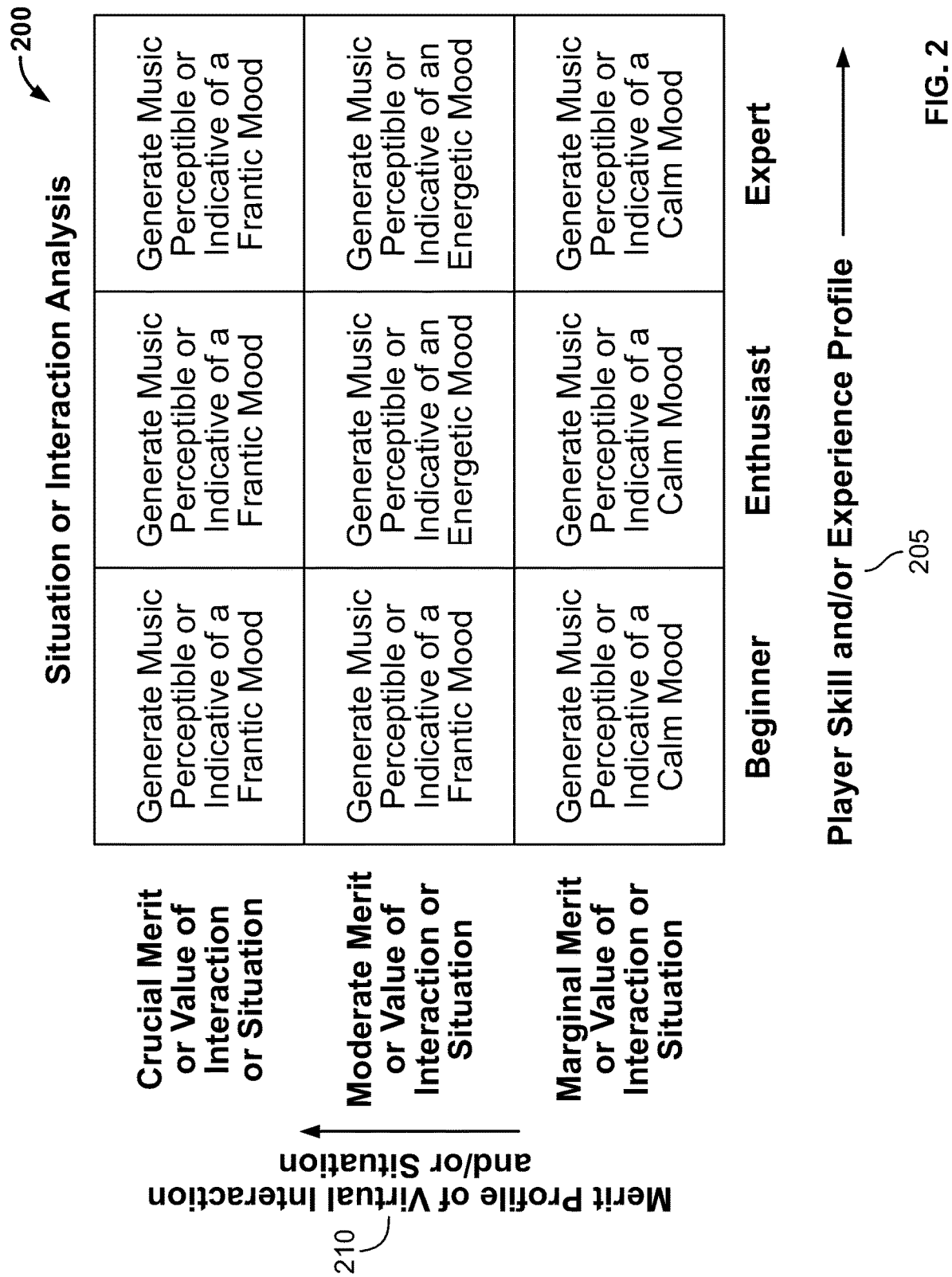
FIG. 2 illustrates an exemplary matrix of music moods generated based on player profile and merit profile, in accordance with some embodiments of the present specification.

Referring to FIG. 2 and Table A, an exemplary matrix of music moods generated based on player data and the merit profile of an interaction and/or situation that the player encounters during gameplay is provided, in accordance with some embodiments of the present specification. The matrix 200 has player data mapped on x-axis 205 and interaction and/or situation profile mapped on y-axis 210. The player data on the x-axis 205 is classified into three exemplary categories of beginner, enthusiast, and expert while the interaction and/or situation profile on the y-axis 210 is classified into three exemplary categories of marginal, moderate, and crucial.

When any of the beginner, enthusiast or expert players encounters an interaction and/or situation of crucial merit or value the music generated is perceptible, reflective, or indicative of a frantic mood, for example. When any of the beginner, enthusiast, or expert players encounters an interaction and/or situation of marginal merit or value the music generated is perceptible, reflective or indicative of a calm mood, for example. When a beginner player encounters an interaction and/or situation of moderate merit or value the music generated is perceptible, reflective or indicative of a frantic mood, for example. On the other hand, when an enthusiast or expert player encounters an interaction and/or situation of moderate merit or value the music generated is perceptible, reflective or indicative of an energetic mood, for example.

Considering, for illustrative purposes, a first-person shooter (FPS) game, any of the following exemplary virtual interactions and/or situations may be representative of a moderate merit profile: a close melee combat with an enemy boss, attacking multiple enemies with a sniper rifle or complex platform jumping maneuvers. Therefore, as illustrated in FIG. 2 and Table A, when a player who may be profiled as a beginner encounters or is confronted with any of these exemplary virtual interactions and/or situations, the dynamic music generation module 140 acquires a music clip and dynamically modifies the intensity, timbre, pitch, and/or rhythm of the music clip to make the music clip indicative of a frantic mood. More specifically, the dynamic music generation module 140 increases the intensity of the digital music clip from a first level to a second level such that it exceeds a predetermined high threshold value. The dynamic music generation module 140 concurrently increases the timbre of the digital music clip from a first level to a second level such that it exceeds a predetermined high threshold value. The dynamic music generation module 140 concurrently increases the rhythm of the digital music clip from a first level to a second level such that it exceeds a predetermined high threshold value. The dynamic music generation module 140 concurrently decreases the pitch of the digital music clip from a first level to a second level such that it is below a predetermined low threshold value. The dynamic music generation module 140 may also concurrently increase or decrease one or more of the beat, meter, tempo, syncopation, dynamics, melody, theme, harmony, chord, progression, consonance, dissonance, key, tonality, register, range, instrumentation, tone color, texture, monophonic, homophonic, polyphonic, imitation, form, duration, loudness, sonic texture or spatial location of the digital music clip from a first level to a second level such that it exceeds or is below a predetermined high threshold value to thereby be reflective of the determined category of music (frantic). The modified music clip, now representative of a frantic mood, is transmitted over the network for playback at the player's client device.

On the other hand, when a player who may be profiled as an enthusiast or expert encounters or is confronted with any of the exemplary virtual interactions and/or situations, representative of a moderate merit profile, the dynamic music generation module 140 dynamically generates music indicative of an energetic mood that is transmitted over the network for playback at the player's client device.

Similarly, as illustrated in FIG. 2 and Table A, when a player who may be profiled as an expert encounters or is confronted with a virtual interaction and/or situation categorized as marginal, the dynamic music generation module 140 acquires a music clip and dynamically modifies the intensity, timbre, pitch, and/or rhythm of the music clip to make the music clip indicative of a calm mood. More specifically, the dynamic music generation module 140 decreases the intensity of the digital music clip from a first level to a second level such that it is below a predetermined low threshold value. The dynamic music generation module 140 concurrently decreases the timbre of the digital music clip from a first level to a second level such that it is below a predetermined low threshold value. The dynamic music generation module 140 concurrently decreases the rhythm of the digital music clip from a first level to a second level such that it is below a predetermined low threshold value. The dynamic music generation module 140 concurrently modulates the pitch of the digital music clip from a first level to a second level such that it meets a predetermined medium value. The dynamic music generation module 140 may also concurrently increase or decrease one or more of the beat, meter, tempo, syncopation, dynamics, melody, theme, harmony, chord, progression, consonance, dissonance, key, tonality, register, range, instrumentation, tone color, texture, monophonic, homophonic, polyphonic, imitation, form, duration, loudness, sonic texture or spatial location of the digital music clip from a first level to a second level such that it exceeds or is below a predetermined high threshold value to thereby be reflective of the determined category of music (calm). The modified music clip, now representative of a calm mood, is transmitted over the network for playback at the player's client device.

In some embodiments, the dynamic music generation module 140 does not dynamically modify the pitch, rhythm, timbre, intensity, beat, meter, tempo, syncopation, dynamics, melody, theme, harmony, chord, progression, consonance, dissonance, key, tonality, register, range, instrumentation, tone color, texture, monophonic, homophonic, polyphonic, imitation, form, duration, loudness, sonic texture or spatial location of a musical clip but, rather, dynamically acquires one of a plurality of pre-recorded music or audio sample files stored in the at least one database system 150, which are pre-classified into a plurality of mood classifications such as, for example, the eight moods illustrated in Table A.

Accordingly, the dynamic music generation module 140 selects and transmits (for playback at the client device) a music or audio file from a mood classification that is pre-programmed to be indicative or reflective of the player profile and the merit profile of the interaction and/or situation being encountered by the player (as illustrated in FIG. 2, for example). In some embodiments, the dynamic music generation module 140 leverages the at least one ML model that is trained to manipulate at least a subset of the plurality of music elements (as illustrated in Table A, for example) to generate music representative of a mood that is programmed to be indicative or reflective of the player profile and the merit profile of the interaction and/or situation being encountered by the player (as illustrated in FIG. 2, for example).

In some embodiments, the dynamic music generation module 140 may generate music based only on the player's profile or merit profile of an interaction and/or situation that the player encounters during gameplay. For example, the dynamic music generation module 140 may generate calm music for a beginner and frantic music for an enthusiast or an expert player. Similarly, the dynamic music generation module 140 may generate calm music when a player encounters an interaction and/or situation of marginal merit or value, energetic music when a player encounters an interaction and/or situation of moderate merit or value, and frantic music when a player encounters an interaction and/or situation of crucial merit or value, for example.

In alternate embodiments, the dynamic music generation module 140 may generate random music either through a random selection of the plurality of pre-recorded music or audio sample files pre-stored in the at least one database system 150 or by leveraging the at least one ML model that manipulates any subset of the plurality of music elements to dynamically generate random music.

Once the generated music is played on the player's client device, the dynamic music generation module 140 further augments, adapts, re-mixes or modulates the playing music in tandem with a progression of the virtual interaction and/or situation (gaming event). This is enabled, in some embodiments, by leveraging the at least one ML model. In some embodiments, music modulation is programmed to closely follow the player responses, inputs or controller movements by manipulating at least a subset of the plurality of music elements in accordance with a plurality of pre-programmed modulation rules. In some embodiments, music modulation is programmed to closely lead player responses, inputs or controller movements by manipulating at least a subset of the plurality of music elements in accordance with a plurality of pre-programmed modulation rules. In some embodiments, music modulation is programmed to first closely follow and later closely lead player responses, inputs or controller movements by manipulating at least a subset of the plurality of music elements in accordance with a plurality of pre-programmed modulation rules.

For example, in a FPS game the player may control an in-game character which is fighting a large enemy boss. New music is initially generated based on the in-game situation while the player is starting to fight the large enemy boss. The music then dynamically changes in the following two exemplary scenarios.

In a first exemplary scenario, the player may be an experienced video game player who quickly understands how to defeat the large enemy boss. The dynamic music generation module 140 receives game data indicating that the player is quickly defeating the boss and dynamically modulates the music to make the experience more intense. Also, in future enemy encounters, the music is dynamically modulated to reflect the experience of the player by heightening the music intensity for a more engaging gameplay experience.

In a second exemplary scenario, the player may be a new video game player or a beginner who has difficulty understanding how to defeat the large enemy boss. The dynamic music generation module 140 receives game data indicating that the player's character has been repeatedly defeated and dynamically modulates the music to make the experience less intense or provides audible leading cues when to attack the enemy or dodge an attack. Also, in future enemy encounters, the music is dynamically modulated to make the gameplay less intense or harrowing to make these encounters more enjoyable and less frustrating.

As further example, Table B illustrates exemplary music modulation during 'progression' of three exemplary virtual interactions and/or situations (that is, close melee combat with enemy boss (representing marginal merit of interaction and/or situation), attacking multiple enemies with sniper rifle (representing moderate merit of interaction and/or situation) and complex platform jumping (representing crucial merit of interaction and/or situation)) in a FPS gameplay by a beginner player profile. In an embodiment, music modulation is done by modulating three exemplary music elements of beat, tempo and duration. Also, music modulation is programmed to closely follow the player's responses, inputs or controller movements.

TABLE B

| | Beginner Player profile Virtual interaction and/or situation (Gaming Event) | | |
|---|---|---|---|
| Music Element | Close Melee Combat with Enemy Boss | Attacking Multiple Enemies with Sniper Rifle | Complex Platform Jumping |
| Beat | Beat is lighter and matches the player's hits | Beat is lighter to simulate a calmer heartbeat | Beat is lighter and matches the player's jumps |
| Tempo | Tempo speed is slower but fluctuates with the player's actions | Tempo speed is slower to simulate a steady heartbeat | Tempo speed is slower but fluctuates with the player's jumping speed |
| Duration | Duration of sound is slightly short | Duration of sound is slightly short | Duration of sound is slightly short |

As another example, Table C illustrates exemplary forms of music modulation during 'progression' of the three exemplary virtual interactions and/or situations for an enthusiast or moderate player profile. Also, music modulation is programmed to closely follow the player's responses, inputs or controller movements.

TABLE C

| | Enthusiast or Moderate Player Profile Virtual interaction and/or situation (Gaming Event) | | |
|---|---|---|---|
| Music Element | Close Melee Combat with Enemy Boss | Attacking Multiple Enemies with Sniper Rifle | Complex Platform Jumping |
| Beat | Beat is moderate and matches the player's hits and some of the major boss hits | Beat is moderate to simulate a tense heartbeat | Beat is moderate and matches the player's jumps and reaching a platform |

TABLE C-continued

| | Enthusiast or Moderate Player Profile Virtual interaction and/or situation (Gaming Event) | | |
|---|---|---|---|
| Music Element | Close Melee Combat with Enemy Boss | Attacking Multiple Enemies with Sniper Rifle | Complex Platform Jumping |
| Tempo | Tempo speed is moderate but fluctuates with the player's actions and boss actions | Tempo speed is moderate to simulate a steady but strong heartbeat | Tempo speed is moderate but fluctuates with the player's jumping speed and success/failure to reach a platform |
| Duration | Duration of sound is moderate | Duration of sound is moderate | Duration of sound is moderate |

As yet another example, Table D illustrates exemplary forms of music modulation during 'progression' of the three exemplary virtual interactions and/or situations for an expert player profile. Also, music modulation is programmed to closely follow the player's responses, inputs or controller movements.

TABLE D

| | Expert Player Profile Virtual interaction and/or situation (Gaming Event) | | |
|---|---|---|---|
| Music Element | Close Melee Combat with Enemy Boss | Attacking Multiple Enemies with Sniper Rifle | Complex Platform Jumping |
| Beat | Beat is high and matches the player's hits/misses and the major boss hits and misses; Very low player health also increases beat | Beat is high to simulate a rapid and tense heartbeat; each miss of a sniper shot increases the beat | Beat is high and matches the player's jumps/running and success/failure to reach a platform |
| Tempo | Tempo speed is high but fluctuates with the player's actions and boss actions, and also delivers during character non-movement | Tempo speed is high to simulate a rapid and tense heartbeat; could fluctuate rapidly or slowly at random times | Tempo speed is high but fluctuates with the player's jumping speed and success/failure to reach a platform, and also during character non-movement |
| Duration | Duration of sound is high | Duration of sound is high | Duration of sound is high |

Persons of ordinary skill in the art would appreciate that the three music elements (beat, tempo and duration), that have been manipulated in Tables B, C and D, are only exemplary and in no way limiting. Thus, in alternate embodiment a variety of different music elements may be manipulated in accordance with a plurality of mixing or manipulation rules and music elements.

In accordance with some aspects of the present specification, the dynamic music generation module 140 monitors, collects, associates/correlates and stores a plurality of data indicative of the player's success or failure, during gameplay, while a particular music composition and/or modulation was being rendered at the player's client device. In embodiments, the plurality of data may comprise statistics such as, but not limited to, number of times in a row (or not) that the player hits or misses an enemy, number of times in a row (or not) that the player attempts to get to a platform, dependency on the number of times the player dies and needs to continue from a previous checkpoint and dependency on whether the player repeats the same fighting or movement pattern.

In some embodiments, if the particular music composition and/or modulation are found to have a statistically significant correlation with the player's success in gameplay, the dynamic music generation module 140 is configured to enable generation of similar music compositions and/or modulations for the player and, in some embodiments, for other players as well. On the other hand, if the particular music composition and/or modulation are found to have a statistically significant correlation with the player's failure in gameplay, the dynamic music generation module 140 is configured to avoid generation of similar music compositions and/or modulations for the player and, in some embodiments, for other players as well.

Figure 3A:
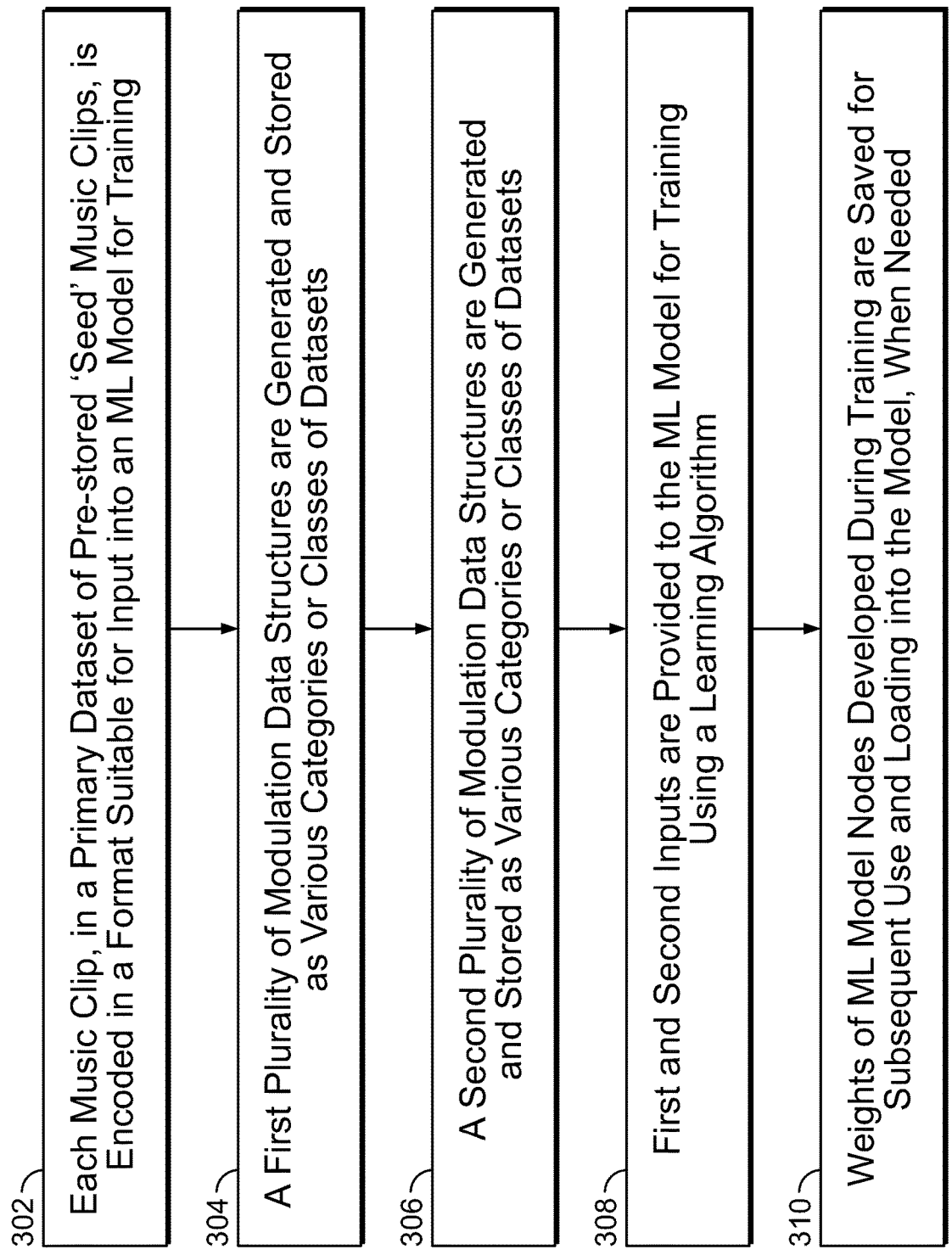
FIG. 3A is a flowchart of a plurality of exemplary steps of training an ML (machine learning) model to generate and modulate music, in accordance with some embodiments of the present specification.

FIG. 3A is a flowchart of a plurality of exemplary steps of training an ML (machine learning) model to modulate music, in accordance with some embodiments of the present specification. In some embodiments, the ML model or architecture comprises one or more of the following computing layers: LSTM layers, Dropout layers, Dense or Fully Connected layers and Activation layers, while each computing layer is composed of a set of neurons or nodes. In some embodiments, the ML model includes three LSTM layers, three Dropout layers, two Dense or Fully Connected layers and one Activation layer. However, persons of ordinary skill in the art would appreciate that the number of each type of layers may vary in various embodiments. In some embodiments, a sequence of the layers in the ML model is as follows: LSTM layer (input layer), Dropout layer, LSTM layer, Dropout layer, LSTM layer, Dense layer, Dropout layer, Dense Layer and Activation layer (output layer).

At step 302, each music clip, in a primary dataset of pre-stored 'seed' music clips, is encoded in a format suitable for input into the ML model for training. In embodiments, each music clip is encoded in or represented by a data structure comprising a sequence of a plurality of music elements or notations of the music clip. In some embodiments, the data structure is a vector or matrix expressing the plurality of music elements or notations. In various embodiments, the plurality of music elements or notations may include at least a subset of elements such as, for example, beat, meter, tempo, syncopation, rhythm, dynamics, melody, intensity, theme, harmony, chord, note, progression, consonance, dissonance, key, tonality, register, range, instrumentation, tone color, texture, monophonic, homophonic, polyphonic, imitation, form, pitch, duration, loudness, timbre, sonic texture and spatial location. The expressed plurality of music elements or notations is in the form of string-based categorical data which is mapped to integer-based numerical data, in some embodiments.

For example, if the music clips in the primary dataset are MIDI (Musical Instrument Digital Interface) files then Music21, a Python toolkit, may be used to extract the music elements or notations of the MIDI files. Thereafter, the extracted music elements or notations, representing string-based categorical data, are mapped to integer-based numerical data such as, for example, one-Hot encoded data for input into the ML model.

Thus, each music clip is represented by a data structure expressing a plurality of music elements of the music clip as a sequence of numerical data. A data structure corresponding to each of the plurality of music clips is associated with the music clip and stored in the primary dataset.

At step 304, a first plurality of modulation data structures are generated and stored as various categories or classes of datasets. Each of the first plurality of modulation data structure expresses numerical values of one or more of a plurality of music elements or notations that need to be modulated in a music clip of the primary dataset. In embodiments, the first plurality of modulation data structures is associated with one or more moods of music (see Table A) determined on the basis of player profile (level of skill and/or experience of a player) and/or merit profile (category of interaction and/or situation that the player engages in during gameplay).

As a non-limiting example, with reference to Table A, a first dataset includes a plurality of modulation data structures expressing intensity, timbre, pitch and rhythm with a range of numerical values representative of a 'happy' mood of music, a second dataset includes a plurality of modulation data structures expressing intensity, timbre, pitch and rhythm with a range of numerical values representative of a 'exuberant' mood of music, a third dataset includes a plurality of modulation data structures expressing intensity, timbre, pitch and rhythm with a range of numerical values representative of a 'energetic' mood of music, a fourth dataset includes a plurality of modulation data structures expressing intensity, timbre, pitch and rhythm with a range of numerical values representative of a 'frantic' mood of music, a fifth dataset includes a plurality of modulation data structures expressing intensity, timbre, pitch and rhythm with a range of numerical values representative of a 'anxious/sad' mood of music, a sixth dataset includes a plurality of modulation data structures expressing intensity, timbre, pitch and rhythm with a range of numerical values representative of a 'depressive' mood of music, a seventh dataset includes a plurality of modulation data structures expressing intensity, timbre, pitch and rhythm with a range of numerical values representative of a 'calm' mood of music, and an eighth dataset includes a plurality of modulation data structures expressing intensity, timbre, pitch and rhythm with a range of numerical values representative of a 'contentment' mood of music.

At step 306, a second plurality of modulation data structures are generated and stored as various categories or classes of datasets. Each of the second plurality of modulation data structure expresses numerical values of one or more of a plurality of music elements or notations that need to be modulated in a music clip of the primary dataset. In embodiments, the second plurality of modulation data structures is associated with modulating music in tandem with "progression" of a virtual interaction and/or situation (see Tables B, C and D) of a player profile during gameplay.

As a non-limiting example, with reference to Tables B, C and D, a ninth dataset includes a plurality of modulation data structures expressing beat, tempo, and duration with a range of numerical values representative of first, second and third types (corresponding to, say, marginal, moderate and crucial virtual engagements) of virtual interaction and/or situation for a player profile of a beginner, a tenth dataset includes a plurality of modulation data structures expressing beat, tempo, and duration with a range of numerical values representative of first, second and third types of virtual interaction and/or situation for a player profile of an enthusiast, and an eleventh dataset includes a plurality of modulation data structures expressing beat, tempo, and duration with a range of numerical values representative of first, second and third types of virtual interaction and/or situation for a player profile of an expert.

At step 308, first and second inputs are provided to the ML model for training using a learning algorithm. In embodiments, the first input is a data structure associated with a music clip from the primary dataset. The music clip functions as 'seed' music data for subsequent modulation. In embodiments, the second input is a modulation data structure from the first and second plurality of modulation data structures and belonging to the first, second, third, fourth, fifth, sixth, seventh, eighth, ninth, tenth and eleventh datasets.

In some embodiments, the ML model is iteratively trained with all data structures of the music clips of the primary dataset provided as the first input one-by-one in combination with the first plurality of modulation data structures provided as the second input one-by-one. The training process is continued with the ML model being iteratively trained with all data structures of the music clips of the primary dataset provided as the first input one-by-one in combination with the second plurality of modulation data structures provided as the second input one-by-one. In embodiments, the ML model is trained for predefined epochs or iterations (say, for example, 250 epochs) with each batch of data structures that is propagated through the ML model.

In embodiments, the first input is provided to a plurality of input nodes of the input LSTM layer while the second input is provided to a plurality of modulatory or bias nodes of the input LSTM layer. In some embodiments, the number of input nodes is such that each of the plurality of music elements or notations of the input data structure is fed into an input node. Similarly, in some embodiments, the number of modulatory or bias nodes is such that each of the plurality of music elements or notations of the input modulatory data structure is fed into a modulatory or bias node.

In embodiments, the learning algorithm uses Categorical Cross Entropy as a Loss function of the model (that is, to calculate the loss for each iteration of the training) and Adaptive Moment Estimation, a variant of Gradient Descent, as an Optimizer of the model. Alternative embodiments may use RMSprop as an Optimizer of the model.

At step 310, the weights of ML model nodes developed during training are saved for subsequent use and loading into the model, when needed.

It should be appreciated that all datasets (primary, first, second, third, fourth, fifth, sixth, seventh, eighth, ninth, tenth and eleventh) are stored in the at least one database system 150 (FIG. 1).

Figure 3B:
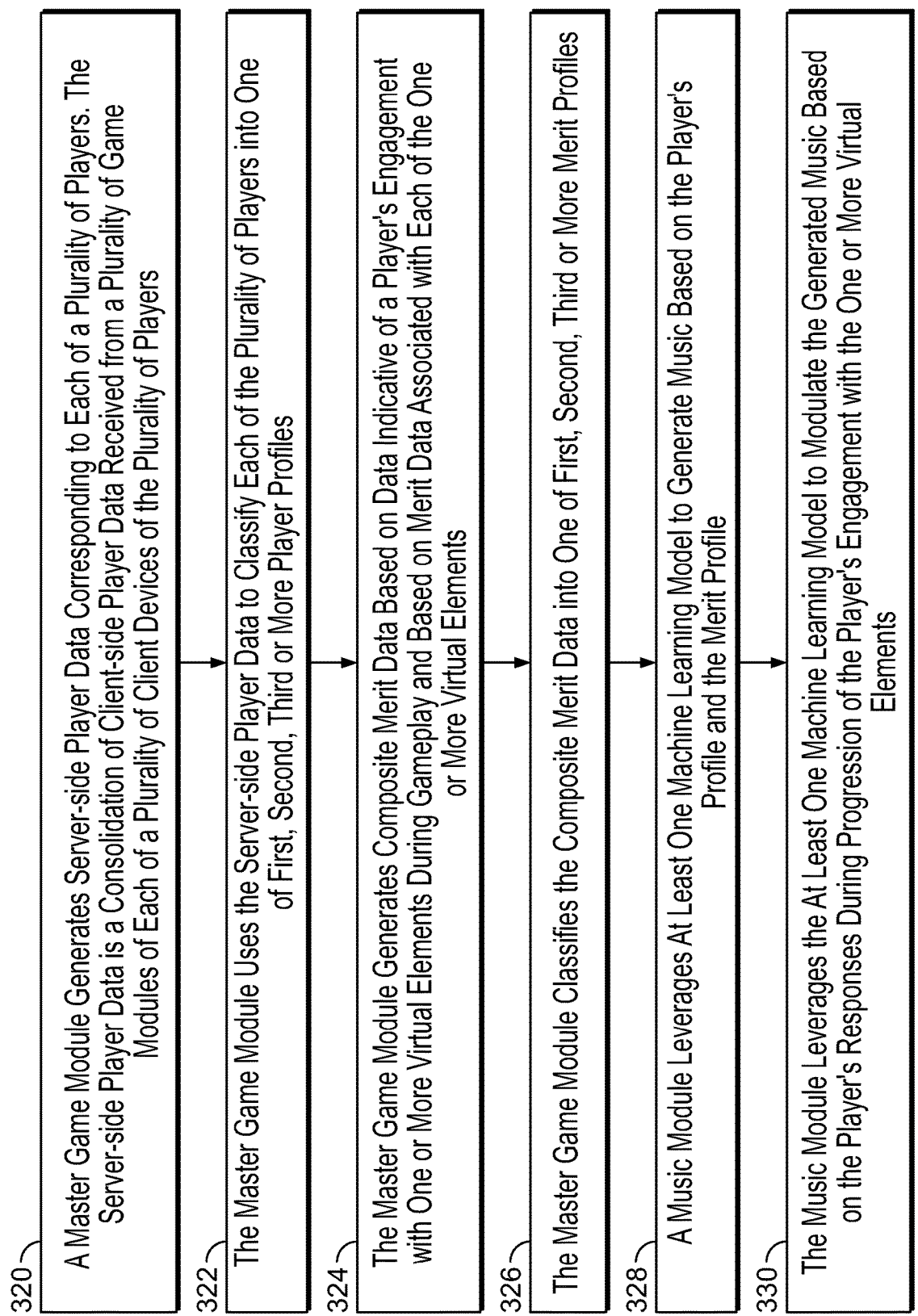
FIG. 3B is a flowchart showing a plurality of exemplary steps of a method of dynamically generating and modulating music personalized to a player engaged in gameplay, in accordance with some embodiments of the present specification.

FIG. 3B is a flowchart of a plurality of exemplary steps of a method of dynamically generating and modulating music personalized to a player engaged in gameplay, in accordance with some embodiments of the present specification. Referring now to FIGS. 1, 3A and 3B, at step 320, the master game module 120 collates client-side player data received from a plurality of game modules 121 corresponding to a plurality of players' client devices 110 in order to generate server-side player data. The server-side player data is representative of a consolidation of various client-side player data encompassing what is occurring or what has occurred as a result of an interaction of all the players with the virtual environment of the game. In embodiments, the server-side player data is stored and updated in at least one database system 150.

At step 322, the master game module 120 uses the server-side player data to classify or categorize each of the plurality of players into a plurality of player profiles. In some embodiments, the plurality of player profiles comprises first, second and third player profiles, wherein the first player profile is representative of a beginner level skill and/or experience, the second player profile is representative of an enthusiast level skill and/or experience and the third player profile is representative of an expert level skill and/or experience.

At step 324, the master game module 120 generates composite merit or event data based on data indicative of a player's engagement (that is, virtual interaction and/or engagement) with one or more virtual elements during gameplay and based on merit data associated with each of the one or more virtual elements. In embodiments, the merit data corresponding to each of the one or more virtual elements is pre-stored in the at least one database system 150.

At step 326, the master game module 120 classifies or categorizes the composite merit data of the player into a plurality of merit profiles. In some embodiments, the plurality of merit profiles comprises first, second and third merit profiles, wherein the first merit profile is representative of marginal value of the player's engagement, the second merit profile is representative of moderate value of the player's engagement and the third merit profile is representative of crucial value of the player's engagement.

At step 328, the dynamic music generation module 140 leverages at least one trained machine learning (ML) module to dynamically generate music based on the player's profile and/or merit data related to the player's engagement with one or more virtual elements during gameplay. In some embodiments, the at least one trained ML model is the one described and trained in the flowchart of FIG. 3A. In embodiments, the dynamic music generation module 140 access the player's profile and merit data related to the player's engagement either directly from the at least one database system 150 or by sending a request to the master game module 120. The generated music is communicated, over the network 115, for playing on the player's client device 110.

In accordance with some embodiments, the dynamic music generation module 140 determines a mood of music that needs to be generated based on the player's profile and/or merit data or profile. Thereafter, the module 140 feeds a data structure of a 'seed' music clip (selected from the primary dataset) as a first input and a relevant modulation data structure as a second input selected from a dataset corresponding to the determined mood. For example, the module 140 may determine that a 'frantic' mood based music needs to be generated since a player of 'beginner' profile is engaged in a gameplay of 'moderate value' (FIG. 2). Accordingly, the module 140 selects a data structure associated with a music clip from the primary dataset and feeds the data structure as a first input to the at least one trained ML model. Additionally, the module 140 selects a modulation data structure (from the first plurality of modulation data structures) associated with a music clip from the fourth dataset and feeds the modulation data structure as a second input to the at least one trained ML model. Consequently, the at least one trained ML model modulates the 'seed' music clip of the first input in accordance with the modulation data structure of the second input to generate or output music perceptible of 'frantic' mood.

At step 330, the dynamic music generation module 140 leverages the at least one trained machine learning module to modulate the generated music based on the player's responses or reactions during progression of the player's engagement with the one or more virtual elements during gameplay.

In accordance with some embodiments, the dynamic music generation module 140 determines a category of modulation that needs to be manifested based on the player's profile and a merit profile (marginal, moderate or crucial) of progression of the player's engagement with the one or more virtual elements during gameplay. Thereafter, the module 140 continues to feed the data structure of the 'seed' music clip (selected from the primary dataset at step 310 of FIG. 3A) as the first input. However, the second input is modified to feed a relevant modulation data structure selected from the second plurality of modulation data structures corresponding to the determined category of modulation.

For example, the module 140 may determine that the player of 'beginner' profile who was engaged in gameplay of moderate merit or value (for example, attacking multiple enemies with sniper rifle) is losing and therefore may need to dynamically modulate the 'seed' music to make the experience less intense for the player. In other words, the module 140 may determine that the 'seed' music needs to be calm. Consequently, the module 140 selects a modulation data structure (from the second plurality of modulation data structures) associated with a music clip from the ninth dataset and feeds the modulation data structure as the second input to the at least one trained ML model. This results in the at least one trained ML model modulating the 'seed' music clip of the first input to generate or output a perceptibly calmer version of the 'seed' music. Also, the output modulated music may be programmed to closely follow the player's responses, inputs or controller movements, in some embodiments.

In some embodiments, the generation and modulation of music is based on the plurality of pre-recorded 'seed' music files and associated data structures as well as first and second plurality of modulation data structures pre-stored in the at least one database system 150. In various embodiments, the generation and modulation of music is accomplished by manipulating at least one of a plurality of music elements such as, but not limited to, beat, meter, tempo, syncopation, rhythm, dynamics, melody, pitch, theme, harmony, chord, progression, consonance, dissonance, key, tonality, register, range, instrumentation, tone color, texture, monophonic, homophonic, polyphonic, imitation, form, pitch, duration, loudness, timbre, sonic texture and spatial location.

Figure 4:
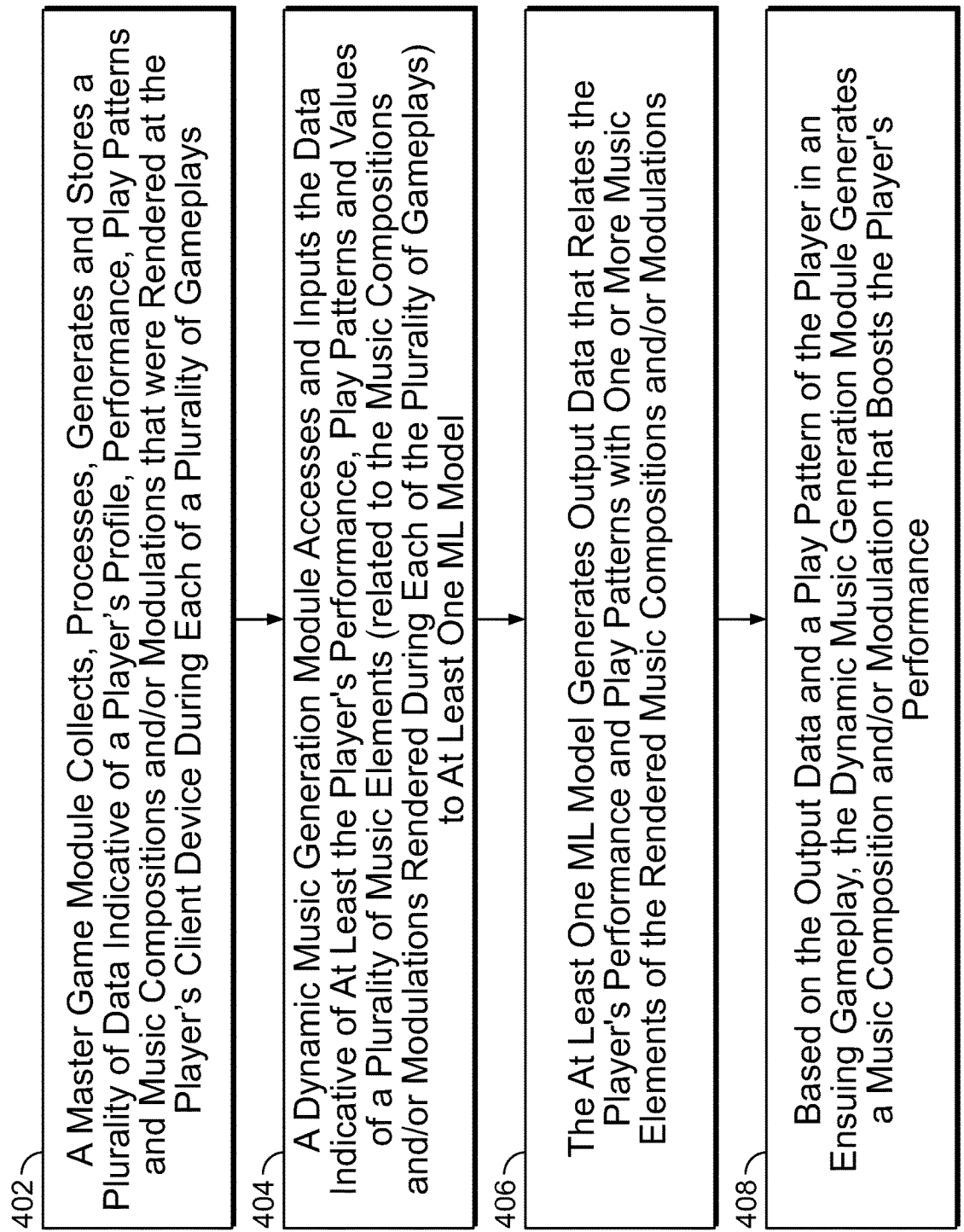
FIG. 4 is a flowchart of a plurality of exemplary steps of a method for enhancing a player's in-game performance using customized music, in accordance with some embodiments of the present specification.

FIG. 4 is a flowchart of a plurality of exemplary steps of a method of enhancing a player's in-game performance using customized music, in accordance with some embodiments of the present specification. Referring now to FIGS. 1 and 4, at step 402 the master game module 120 collects, processes, generates and stores (in the at least one database system 150) a plurality of data indicative of a) the player's profile, b) the player's performance (success or failure in terms of a plurality of metrics, scoring, or statistics such as, for example, points scored, kill ratios, etc.) during each of a plurality of gameplays, c) the player's play patterns or gameplay interactions during each of the plurality of gameplays (and with reference to a plurality of game events) and d) music compositions and/or modulations (expressed in terms of a plurality of music elements or notations) that were being rendered at the player's client device during each of the plurality of gameplays. It should be appreciated that the dynamic music generation module 140 is configured to generate and modulate music possessing various range of values of at least a subset of a plurality of music elements or notations for similar or same game events across various gameplays.

In various embodiments, the data is aggregated and collated during quality control and testing of a game and/or from a large population of players engaged in actual gameplay across many instances of the game.

At step 404, the dynamic music generation module 140 accesses (from the at least one database system 150) and feeds or inputs the data indicative of at least the player's performance, play patterns and values of the plurality of music elements related to the music compositions and/or modulations rendered during each of the plurality of gameplays to at least one ML model. The at least one ML model is trained to recognize patterns and correlations amongst inputted data. In various embodiments, the at least one trained ML model or artificial neural network comprises one of a deep feed forward network, a perceptron network, a feed forward network, a radial basis network, a recurrent neural network, a long term memory network, a short term memory network, a gated recurrent unit network, an auto encoder network, a variational auto encoder network, a denoising auto encoder network, a sparse auto encoder network, a Markov chain network, a Hopfield network, a Boltzmann machine network, a restricted Boltzmann machine network, a deep belief network, a deep convolutional network, a deconvolutional network, a deep convolutional inverse graphics network, a generated adversarial network, a liquid state machine, an extreme learning machine, an echo state network, a deep residual network, a Kohonen network, a support vector machine network, a neural Turing machine network, or a convolutional neural network with transfer learning network.

In some embodiments, the at least one machine learning model is a deep learning feed-forward network such as a multilayer convolutional neural network (CNN). Persons of ordinary skill in the art would understand that each layer of the multilayer CNN has a weight matrix associated therewith that is determined during learning, also referred to as a training stage. In accordance with some embodiments, the CNN is trained using back propagation with gradient descent and using human-labeled set of training data.

At step 406, the at least one ML model generates output data that relates the player's performance and play patterns with one or more music elements related to rendered music compositions and/or modulation. In other words, the output data is indicative of which types of music compositions and/or modulations (expressed in terms of one or more music elements and the associated value ranges) lead to improved or reduced performance of the player during which play patterns, thereby providing insight on how rendered music actually affects game outcomes for the player. The dynamic music generation module 140 stores the generated output data for the player in the at least one database system 150. It should be appreciated that the stored output data for the player is continuously updated as more data is available for the player from future gameplays.

During a subsequent gameplay, at step 408, the dynamic music generation module 140 receives the player's play patterns in real-time, as monitored by the master game module 120 in communication with the game module 121. For an ensuing play pattern, the module 140 accesses the at least one database system 150 to retrieve stored output data (generated at step 406) indicative of at least one music composition and/or modulation (expressed in terms of one or more music elements and the associated value ranges) that leads to improved/enhanced player performance for the ensuing play pattern. Consequently, the at least one music composition and/or modulation is generated by the dynamic music generation module 140 for rendering at the player's game module 121, thereby "boosting" the player's performance by playing music having the right music elements and associated value ranges.

In embodiments, the methods and systems of the present specification allow for the rapid creation of music and audio that may not have been created manually. In addition, the methods and systems of the present specification can be used for cost savings as the tools and content generated may be used across multiple games within the same genre and franchise, multiple game platforms even with disparate brands, and multiple types of gameplay.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A computer-implemented method of dynamically generating a music clip for rendering at each of a plurality of client devices corresponding to each of a plurality of players in a multi-player gaming network, wherein the multi-player gaming network comprises at least one game server in data communication with the plurality of client devices located remote from each other, the method comprising:

receiving, in the at least one game server, player data corresponding to each of said plurality of players, wherein said player data is received from a plurality of game modules stored locally in each of the plurality of client devices;

classifying, in the at least one server and using said player data, each of said plurality of players into one or more player profiles;

generating, in the at least one game server, event data based on data indicative of a player's engagement with one or more virtual elements during gameplay and based on data associated with each of said one or more virtual elements;

classifying, in the at least one server, the event data into two or more event profiles;

generating the music clip based on at least one of the two or more event profiles and at least one of the one or more player profiles, wherein the music clip is generated by identifying a mood based on the at least one of the two or more event profiles and the at least one of the one or more player profiles, and wherein the music clip is generated by modulating one or more elements of a segment of audio data based on the identified mood; and transmitting the generated music clip to at least one of the plurality of client devices.

2. The computer-implemented method of claim 1 wherein the one or more elements comprise beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture or spatial location.

3. The computer-implemented method of claim 1 further comprising generating the music clip by selecting a segment of audio data based on the identified mood.

4. The computer-implemented method of claim 1 further comprising generating the music clip by implementing at least one machine learning model using the at least one of the two or more event profiles and the at least one of the one or more player profiles.

5. The computer-implemented method of claim 4 further comprising generating additional music clips by implementing at least one machine learning model and using at least one of the plurality of players' responses during engagement with said one or more virtual elements.

6. The computer-implemented method of claim 1, wherein said data indicative of the player's engagement with said one or more virtual elements is received from a game module of the player's client device.

7. The computer-implemented method of claim 1, wherein said two or more player profiles comprise a beginner level of skill and/or experience, an enthusiast level of skill and/or experience, and an expert level of skill and/or experience.

8. The computer-implemented method of claim 1, wherein the two or more event profiles comprise a first event profile representative of a low value of the player's engagement, a second event profile representative of a medium value of the player's engagement, and a third event profile representative of a high value of the player's engagement.

9. A system for dynamically generating a music clip for rendering at each of a plurality of client devices corresponding to each of a plurality of players in a multi-player gaming network, wherein the multi-player gaming network comprises at least one game server in data communication with the plurality of client devices located remote from each other, the server comprising a plurality of programmatic instructions that, when executed:

receive player data corresponding to each of said plurality of players, wherein said player data is received from a plurality of game modules stored locally in each of the plurality of client devices;

classify each of the plurality of players into one or more player profiles;

generate event data based on data indicative of a player's engagement with one or more virtual elements during gameplay and based on data associated with each of said one or more virtual elements;

classify the event data into two or more event profiles;

generate the music clip based on at least one of the two or more event profiles and at least one of the two or more player profiles, wherein the music clip is generated by identifying a mood based on the at least one of the two or more event profiles and the at least one of the one or more player profiles, and wherein the music clip is generated by modulating one or more elements of a segment of audio data based on the identified mood; and transmit the generated music clip to at least one of the plurality of client devices.

10. The system of claim 9 wherein the one or more elements comprise beat, meter, tempo, syncopation, rhythm, dynamics, melody, intensity, theme, harmony, chord, progression, consonance, dissonance, key, tonality, register, range, instrumentation, tone color, texture, monophonic, homophonic, polyphonic, imitation, form, pitch, duration, loudness, timbre, sonic texture or spatial location.

11. The system of claim 9 further comprising programmatic instructions that, when executed, generate the music clip by selecting a segment of audio data based on the identified mood.

12. The system of claim 9 further comprising programmatic instructions that, when executed, generate the music clip by implementing at least one machine learning model using the at least one of the two or more event profiles and the at least one of the one or more player profiles.

13. The system of claim 12 further comprising programmatic instructions that, when executed, generate additional music clips by implementing at least one machine learning model using at least one of the plurality of players' responses during engagement with said one or more virtual elements.

14. The system of claim 9, wherein said data indicative of the player's engagement with said one or more virtual elements is received from a game module of the player's client device.

15. The system of claim 9, wherein the one or more player profiles comprise a beginner level of skill and/or experience, an enthusiast level of skill and/or experience, and an expert level of skill and/or experience.

16. The system of claim 9, wherein the two or more event profiles comprise a first event profile representative of a low value of the player's engagement, a second event profile representative of a medium value of the player's engagement, and a third event profile representative of a high value of the player's engagement.

* * * * *